Figure 1:
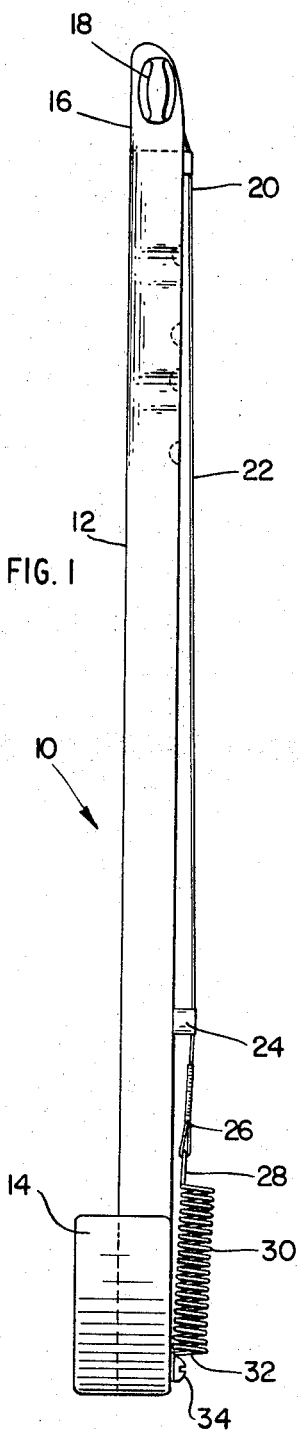

United States Patent

[11] 3,575,078

| [72] | Inventor | Robert N. Currier |
| | | 9 Second St., North Providence, R.I. 02908 |
| [21] | Appl. No. | 759,009 |
| [22] | Filed | Sept. 11, 1968 |
| [45] | Patented | Apr. 13, 1971 |

[54] MUSICAL STRING INSTRUMENT
3 Claims, 2 Drawing Figs.

[52] U.S. Cl. .................................................. 84/173, 84/274, 84/470
[51] Int. Cl. .................................................. G10d 1/02
[50] Field of Search .................................................. 84/173, 173.1, 274, 281, 283, 328, 267

[56] References Cited
UNITED STATES PATENTS

| 992,765 | 5/1911 | Garrett | 84/281 |
| 2,033,826 | 3/1936 | Haium | 84/173.1 |
| 2,782,670 | 2/1957 | Lizski | 84/283 |
| 516,427 | 3/1894 | Bent | 84/274 |
| 974,095 | 10/1910 | Schlemmer | 84/297 |
| 1,684,057 | 9/1928 | Fisher | 84/297 |
| 2,130,248 | 9/1938 | Peate | 84/297 |
| 3,481,238 | 12/1969 | Veres | 84/267 |
| 2,514,835 | 7/1950 | Bredice | 84/297 |

FOREIGN PATENTS

| 422,879 | 1/1935 | Great Britain | 84/173.1 |

*Primary Examiner*—Richard B. Wilkinson
*Assistant Examiner*—Lawrence R. Franklin
*Attorney*—Wolf, Greenfield and Sacks

ABSTRACT: An elementary bowed string instrument having a string tensioned by an extendable spring anchored at one end to enable the string to be tuned visually by a marker cooperating with a pointer carried by the string.

Patented April 13, 1971 3,575,078

INVENTOR.
ROBERT N. CURRIER
BY
Wolf, Greenfield & Sacks
ATTORNEYS

MUSICAL STRING INSTRUMENT

This invention relates to musical instruments and more particularly comprises an elementary single string bowed instrument especially suitable for use in teaching music to youngsters.

An elementary music classroom which is focused too predominantly on vocal music fails to orient the student to much that is essential to music. Indeed, many children respond more positively to a strongly instrumental approach. For this reason various rhythm instruments, autoharps, recorders etc. are found in the well equipped elementary school music room. Such instruments not only stimulate the children but also introduce to them a number of musical concepts. A classroom device which can also prepare the student technically for later study of a specific musical instrument is an even greater asset. Particularly is this true of bowed string instruments, for which an early start is directly related to ultimate success.

One important object of this invention is to provide a bowed string instrument which can be used to prepare the student technically for later study of the violin and its sister instruments.

Another important object of this invention is to provide a bowed string instrument of simple and sturdy construction.

Still another important object of this invention is to provide a simple bowed string instrument which can be easily tuned.

Yet another important object of this invention is to provide a bowed string instrument that promotes the forming of correct playing habits.

And yet another important object of this invention is to provide a simple bowed string instrument which a classroom music teacher with little or no string instrument training can learn to manipulate without difficulty.

To accomplish these and other objects, the string instrument of this invention comprises a neck and body which together form the instrument frame. A bridge on the frame supports the single string. One end of the string is secured to a tuning peg while the other is secured to a spring which is deflectable in the direction in which the string extends. A tuning marker is provided on the frame which cooperates with the spring to indicate that the tension on the string has achieved a desired value.

Figure 2:
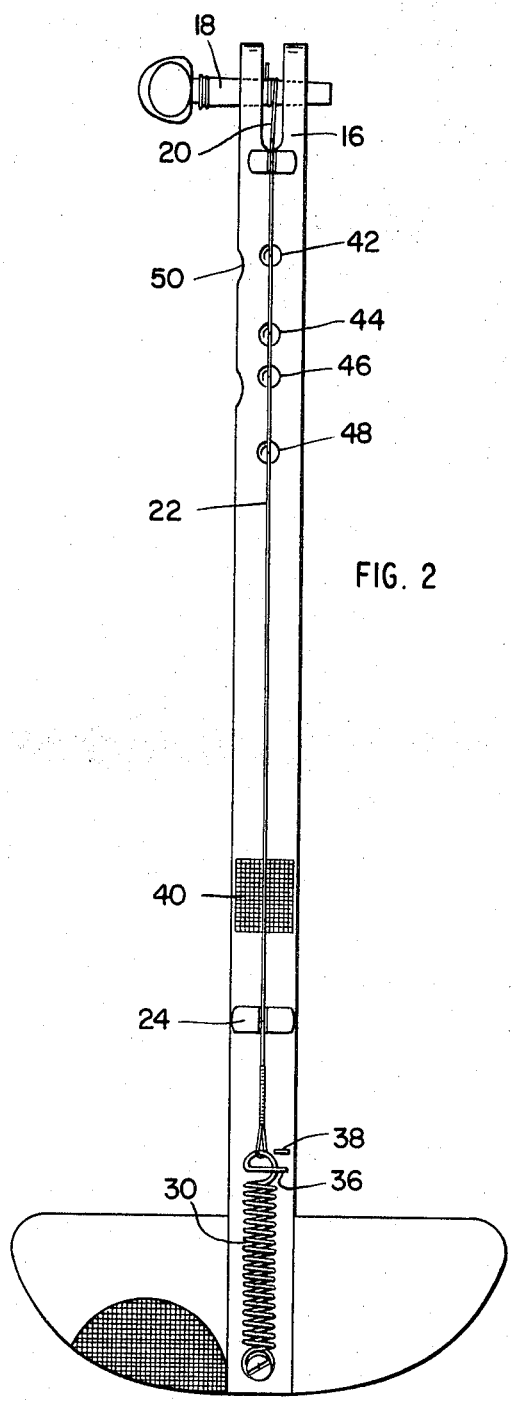

These and other objects and features of this invention along with its incident advantages will be better understood and appreciated from the following detailed description of one embodiment thereof, selected for purposes of illustration and shown in the accompanying drawing, in which:

FIG. 1 is a side view of a bowed string instrument constructed in accordance with this invention; and FIG. 2 is a plan view thereof.

The elementary instrument shown in the drawing includes a main frame 10 composed of a neck 12 and body 14 which may be made of wood, plastic, or some other material having the necessary strength to serve its intended function. The free end 16 of the neck 12 is forked as shown in FIG. 2 and carries a peg 18 secured to the end 20 of string 22. The string 22 extends from the peg 18 over a bridge 24 to the body 14 where its end 26 is secured to the end 28 of coil spring 30. The other end 32 of the spring 30 is anchored by screw 34 to the body 14. Thus, the combination of string 22 and spring 30 comprises a string means that extends from the end 16 of the neck to the end of the body 14.

The end 28 of spring 30 is shown in FIG. 2 to be formed as a loop with its exposed end 36 extending laterally to the direction of the string 22 to form a pointer which is designed to cooperate with a tuning mark 38 on the neck 12. The pitch of any selected string 22 when bowed is of course a function of the tension applied to it, and the spring 30 serves as a means for applying a known tension load on the string and allows the amount of tension to be determined visually. It will be apparent that as the peg 18 is turned to wind the string 22 on it, the spring 30 stretches and applies a tension load on the string which is a function of the spring elongation. The load applied to the string 22 will always be the same if the spring is stretched to the same length. The pointer 36 and tuning mark 38 cooperate so as to indicate visually to the user that a selected tension has been applied to the string 22 and it therefore has achieved a certain pitch when bowed or plucked. Thus, it will be appreciated that the instrument may be accurately tuned visually and does not require the user to audibly compare the tone of the string 22 with some reference tone.

In FIG. 2 it will be observed that a bowing area 40 is marked on the neck 12 just below the bridge 24 so as to indicate to the player the proper position of the bow as it is drawn across the string 22.

Four finger recesses 42, 44, 46 and 48 are provided at the end 16 of the neck 12 to locate for the student the proper finger positions on the string 22. The thumb of the student is located in the notch 50 provided in the side of the neck. Thus, precise hand location is achieved by using the finger recesses and thumb notch.

From the foregoing description it will be appreciated that the several objects of this invention set forth in the introduction are achieved. The instrument is very inexpensive to manufacture as it is made of parts that may be readily fabricated from inexpensive material. The single string of the instrument may be tuned visually merely by tightening the string by turning the peg 18 until the pointer 36 is aligned with the tone mark 38, thus eliminating the need of comparing the tone audibly with a piano. The guide 40 on the neck serves to assist the student in properly positioning the bow on the string above the neck, and the various finger recesses and notches provide a ready guide to locate the left hand.

I claim:

1. An elementary single string instrument comprising:

a long and relatively narrow neck and body members providing the instrument frame, said body member extending outwardly from one end of the neck and adapted to be placed under the chin when the instrument is played and form a T-shaped frame configuration;

a bridge on one of the members to support the instrument string intermediate its ends;

a single playing string adapted to be bowed extending over the bridge and secured at one end to the end of the neck opposite the body;

a coil spring connecting the other end of the string to the body and bearing part of the tension of the string which extends over the bridge;

a peg rotatably mounted on said opposite end of the neck and joining the string to said end for varying the tension on the string to vary the pitch of the string when bowed; and a tuning mark cooperative visually with the spring for indicating that the tension on the string is of a selected value to achieve a desired pitch.

2. An elementary string instrument as defined in claim 1 further characterized by thumb and finger recesses provided in the end of the neck for assisting the user in the proper hand position.

3. An elementary string instrument as defined in claim 2 further characterized by a bowing area denoted on the neck for indicating to the user the proper position of the bow on the string.